US009411286B2

(12) United States Patent
Miyadera

(10) Patent No.: US 9,411,286 B2
(45) Date of Patent: Aug. 9, 2016

(54) IMAGE FORMING APPARATUS, IMAGE FORMING METHOD, AND COMPUTER-READABLE STORAGE MEDIUM THAT CHANGE DATA LENGTHS OF FIRST DATA AND SECOND DATA ACCORDING TO A CONDITION OF IMAGE FORMATION

(71) Applicant: Tatsuya Miyadera, Kanagawa (JP)

(72) Inventor: Tatsuya Miyadera, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/658,642

(22) Filed: Mar. 16, 2015

(65) Prior Publication Data

US 2015/0261158 A1 Sep. 17, 2015

(30) Foreign Application Priority Data

Mar. 17, 2014 (JP) ................................ 2014-054215

(51) Int. Cl.
*G06F 3/12* (2006.01)
*G03G 15/00* (2006.01)

(52) U.S. Cl.
CPC ............ *G03G 15/50* (2013.01); *G03G 15/5058* (2013.01); *G03G 2215/0132* (2013.01); *G03G 2215/0141* (2013.01)

(58) Field of Classification Search
CPC .............. G03G 15/00; G03G 15/2039; G03G 2215/209; G03G 15/50; G03G 15/5038; G06K 15/1894; H03M 13/45; H03M 5/145; H04L 25/4908; B41J 2/2132
USPC ............ 358/1.13, 1.15, 1.16; 399/14, 16, 19, 399/38, 49, 50
See application file for complete search history.

(56) References Cited

U.S. PATENT DOCUMENTS 6,494,559 B1 * 12/2002 Tsuji .................... B41J 2/17546 347/19
8,634,090 B2 * 1/2014 Akamatsu ............. G03G 15/00 358/401

(Continued)

FOREIGN PATENT DOCUMENTS

JP 2010-114762 5/2010
JP 2011-019188 1/2011

OTHER PUBLICATIONS

English Machine Translation of JP 2011-019188-A (Izawa, Published Jan. 27, 2011).*

(Continued)

*Primary Examiner* — Benny Q Tieu
*Assistant Examiner* — Juan M Guillermety
(74) *Attorney, Agent, or Firm* — Oblon, McClelland, Maier & Neustadt, L.L.P

(57) ABSTRACT

An image forming apparatus includes a serial data output unit configured to convert image data into serial data and output the serial data along with first data for detecting unique data in the image data and second data so that the first data is arranged before the image data and the second data is arranged after the image data; a data length change unit configured to change data lengths of the first data and the second data; a parallel data output unit configured to convert the image data of the serial data output from the serial data output unit into parallel data, and output the parallel data; and a data controller configured to control the data length change unit to change the data lengths of the first data and the second data to be arranged before and after the image data according to a condition of image formation.

11 Claims, 7 Drawing Sheets

(56) References Cited

U.S. PATENT DOCUMENTS

| | | | | |
|---|---|---|---|---|
| 2004/0088633 | A1* | 5/2004 | Lida | H03M 5/145 714/752 |
| 2008/0038024 | A1 | 2/2008 | Miyadera | |
| 2008/0069602 | A1 | 3/2008 | Miyadera | |
| 2008/0219682 | A1* | 9/2008 | Yamasaki | G03G 15/5058 399/16 |
| 2011/0043592 | A1 | 2/2011 | Kinoshita et al. | |
| 2012/0056961 | A1 | 3/2012 | Kinoshita et al. | |
| 2012/0062681 | A1 | 3/2012 | Miyadera et al. | |
| 2012/0300010 | A1 | 11/2012 | Kawanabe et al. | |
| 2014/0092157 | A1* | 4/2014 | Yoshida | B41J 2/2128 347/14 |
| 2014/0119750 | A1* | 5/2014 | Jinno | G03G 15/0173 399/38 |
| 2014/0240778 | A1* | 8/2014 | Itogawa | G06F 3/1292 358/1.15 |

OTHER PUBLICATIONS

U.S. Appl. No. 14/600,339, filed Jan. 20, 2015.

* cited by examiner

IMAGE FORMING APPARATUS, IMAGE FORMING METHOD, AND COMPUTER-READABLE STORAGE MEDIUM THAT CHANGE DATA LENGTHS OF FIRST DATA AND SECOND DATA ACCORDING TO A CONDITION OF IMAGE FORMATION

CROSS-REFERENCE TO RELATED APPLICATION

The present application claims priority to and incorporates by reference the entire contents of Japanese Patent Application No. 2014-054215 filed in Japan on Mar. 17, 2014.

BACKGROUND OF THE INVENTION

1. Field of the Invention

The present invention relates to an image forming apparatus, an image forming method, and a computer-readable storage medium.

2. Description of the Related Art

Conventionally, in high-speed serial communication using 8B10B conversion, a predetermined code called symbol code can be transmitted, in addition to conversion/transmission of active data such as image data. Note that the 8B10B conversion is an encoding method used for a high-speed serial interface, and is a technology known as a method to convert 8-bit data into a 10-bit symbol, and to transmit the data.

There are twelve types of symbol codes as a total, and a technology to control the high-speed serial communication is known, which adds symbol codes to before and after data, and determines occurrence of a transmission error when a receiving side cannot receive the symbol codes.

Japanese Laid-open Patent Publication No. 2011-19188 discloses a technology described below. A serializer circuit inserts additional information for detecting image data in parallel data to before and after the image data in the parallel data, successively inserts specific symbol codes between respective symbol codes, and variably controls the number of insertion of the specific symbol codes.

However, in the above-described conventional technology to control the high-speed serial communication, the symbol codes are added to before and after data, and thus data transfer time of one line becomes long. When the technology is used for transfer of image data of an image forming apparatus, there is a problem that a limit on productivity is caused. Further, similarly, in Japanese Laid-open Patent Publication No. 2011-19188, the data transfer time becomes long when the number of insertion of the symbol codes is variably controlled, and when the technology is used for transfer of image data of an image forming apparatus, the limit on productivity is caused.

Therefore, there is a need to realize transfer of image data without causing a limit on productivity.

SUMMARY OF THE INVENTION

It is an object of the present invention to at least partially solve the problems in the conventional technology.

According to an embodiment, there is provided an image forming apparatus that includes a serial data output unit configured to convert image data into serial data and output the serial data along with first data for detecting unique data in the image data and second data so that the first data is arranged before the image data and the second data is arranged after the image data; a data length change unit configured to change data lengths of the first data and the second data; a parallel data output unit configured to convert the image data of the serial data output from the serial data output unit into parallel data, and output the parallel data; and a data controller configured to control the data length change unit to change the data lengths of the first data and the second data to be arranged before and after the image data according to a condition of image formation.

According to another embodiment, there is provided an image forming method that includes: converting image data into serial data; outputting the serial data along with first data for detecting unique data in the image data and second data so that the first data is arranged before the image data and the second data is arranged after the image data; changing data lengths of the first data and the second data; converting the image data of the serial data into parallel data; outputting the parallel data; and changing the data lengths of the first data and the second data to be arranged before and after the image data according to a condition of image formation.

According to still another embodiment, there is provided a non-transitory computer-readable storage medium with an executable program stored thereon and executed by a computer. The program instructs the computer to perform: converting image data into serial data; outputting the serial data along with first data for detecting unique data in the image data and second data so that the first data is arranged before the image data and the second data is arranged after the image data; changing data lengths of the first data and the second data; converting the image data of the serial data into parallel data; outputting the parallel data; and changing the data lengths of the first data and the second data to be arranged before and after the image data according to a condition of image formation.

The above and other objects, features, advantages and technical and industrial significance of this invention will be better understood by reading the following detailed description of presently preferred embodiments of the invention, when considered in-connection with the accompanying drawings.

DETAILED DESCRIPTION OF THE PREFERRED EMBODIMENTS

Embodiments of an image forming apparatus, an image forming method, and a computer-readable storage medium according to the invention will be described in detail with reference to the appended drawings.

Embodiments

In the present embodiment, in an image forming apparatus using high-speed serial communication, which adds a plurality of individual symbol codes to before and after data and can change the number of insertion of the symbol codes, the number of insertion of the symbol codes is optimally set according to a condition of the image forming apparatus. Hereinafter, a specific example will be described.

Figure 1:
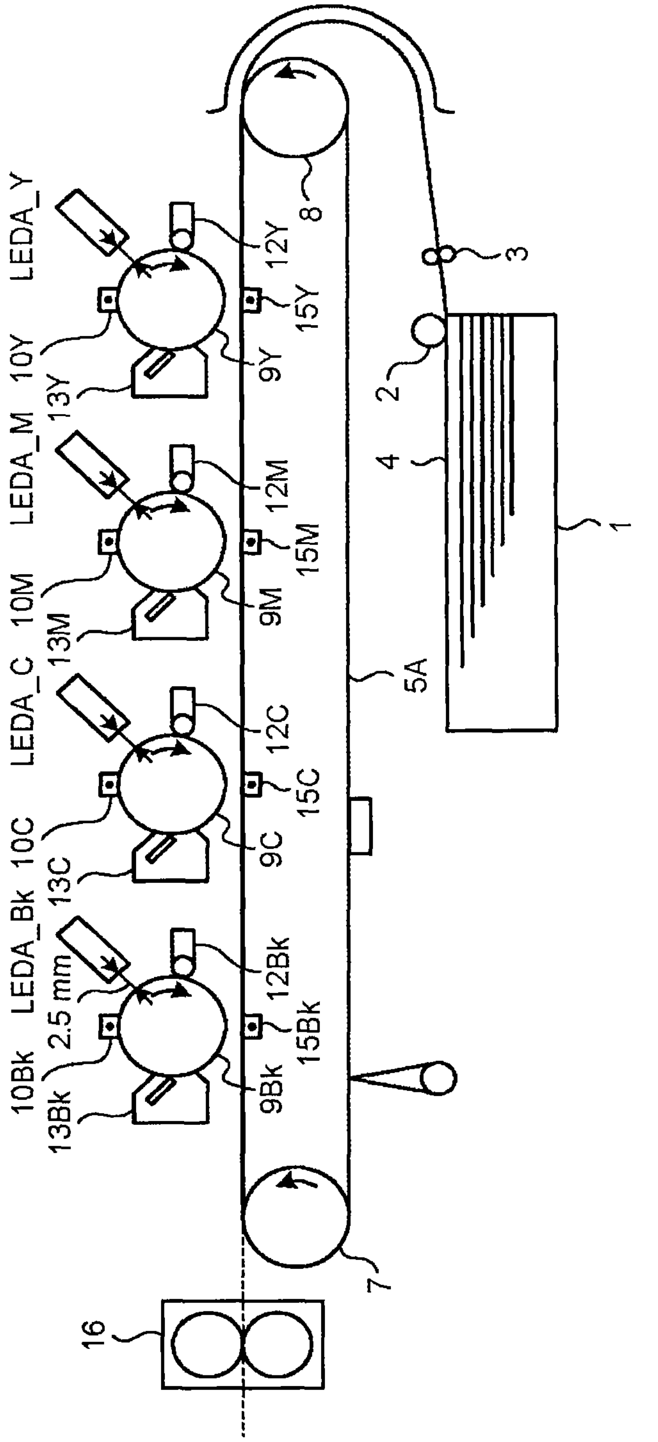
FIG. 1 is an explanatory diagram of a configuration (1) of an image forming apparatus.

First of all, a configuration example of an image forming apparatus will be described. FIG. 1 is an explanatory diagram of a configuration (1) of an image forming apparatus. The present image forming apparatus is a so-called tandem system, and has a configuration in which image forming units of respective colors are aligned along a conveying belt that is a moving member, as illustrated in FIG. 1.

That is, a plurality of image forming units (electrophotography process units) 6Y, 6M, 6C, and 6Bk (denoted with the reference sign 6 in the drawing) are arrayed in order from an upper stream side of a conveying direction of a conveying belt 5A along the conveying belt 5A that conveys a sheet (recording paper) 4 separated and fed from a paper feeding tray 1 by a paper feeding roller 2 and a separation roller 3. The plurality of image forming units 6Y, 6M, 6C, and 6Bk have a common internal configuration except that colors of toner images to be formed are different. The image forming unit 6Bk forms a black image, the image forming unit 6C forms a cyan image, the image forming unit 6M forms a magenta image, and the image forming unit 6Y forms a yellow image, respectively.

Therefore, in the description below, the image forming unit 6Y will be specifically described. However, other image forming units 6M, 6C, and 6Bk are similar to the image forming unit 6Y, and thus configuration elements of the image forming units 6M, 6C, and 6Bk are denoted with reference signs distinguished with M, C, and Bk in place of Y denoted to configuration elements of the image forming unit 6Y, and description is omitted.

The conveying belt 5A is an endless belt wound around a driving roller 7 and a driven roller 8, which are driven and rotated. The driving roller 7 is driven and rotated by a drive motor (not illustrated), and the drive motor, the driving roller 7, and the driven roller 8 function as a driving unit that moves the conveying belt 5A as the moving member. In forming an image, the sheets 4 housed in the paper feeding tray 1 are sent in order from a top sheet, adsorbed to the conveying belt 5 by an action of electrostatic adsorption, conveyed to the first image forming unit 6Y by the driven and rotated conveying belt 5A, and are transferred a yellow toner image. The image forming unit 6Y is configured from a photoconductor drum 9Y as a photoconductor, a charging device 10Y arranged around the photoconductor drum 9Y, a developing device 12Y, a LEDA head Y, a photoconductor cleaner (not illustrated), a static elimination device 13Y, and the like. The LEDA head is configured to expose the image forming units 6Y, 6M, 6C, and 6Bk.

In forming an image, an outer peripheral surface of the photoconductor drum 9Y is uniformly changed by the charging device 10Y in the dark, then is exposed by emitted light corresponding to the yellow image, from the LEDA head, and is formed an electrostatic latent image. The developing device 12Y causes the electrostatic latent image to become a visible image by a yellow toner. Accordingly, the yellow toner image is formed on the photoconductor drum 9Y. The toner image is transferred on the sheet 4 by an action of a transfer device 15Y at a position (transfer position) where the photoconductor drum 9Y and the sheet 4 on the conveying belt 5A come in contact with each other.

By the transfer, an image by the yellow toner is formed on the sheet 4. The photoconductor drum 9Y that has completed the transfer of the toner image is eliminated static electricity by the static elimination device 13Y, and waits for the next image formation, after unnecessary residual toner on the outer peripheral surface is removed by the photoconductor cleaner. As described above, the sheet 4 on which the yellow toner image is transferred in the image forming unit 6Y is conveyed by the conveying belt 5A to the next image forming unit 6M. In the image forming unit 6M, a magenta toner image is formed on the photoconductor drum 9M by a similar process to the image forming process in the image forming unit 6Y, and the toner image is superimposed and transferred on the yellow image formed on the sheet 4.

The sheet 4 is conveyed to the next image forming units 6C and 6Bk, and a cyan toner image formed on the photoconductor drum 9C and a black toner image formed on the photoconductor drum 9Bk are superimposed and transferred on the sheet 4 by a similar operation. Accordingly, a full color image is formed on the sheet 4. The sheet 4 on which the full color superimposed image is separated from the conveying belt 5A and the image on the sheet 4 is fixed by a fixing device 16, and then the sheet 4 is ejected to an outside of the image forming apparatus.

Figure 2:
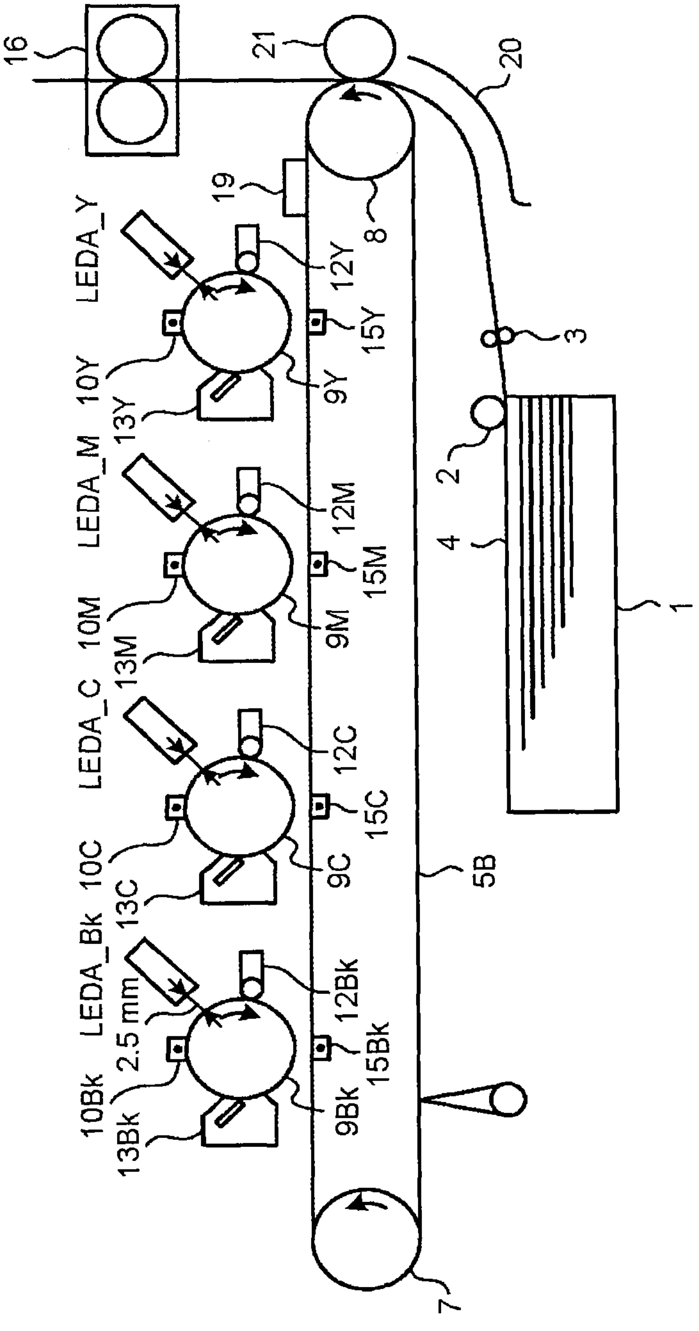
FIG. 2 is an explanatory diagram of a configuration (2) of an image forming apparatus.

FIG. 2 is an explanatory diagram of a configuration (2) of an image forming apparatus. In FIG. 2, a moving member is not a conveying belt, and is an intermediate transfer belt 5B. The intermediate transfer belt 5B is an endless belt wound around the driving roller 7 and the driven roller 8, which are driven and rotated. Toner images of the respective colors are transferred on the intermediate transfer belt 5B by an action of transfer devices 15Y, 15M, 15C, and 15Bk, at a position (primary transfer position) in which the photoconductor drums 9Y, 9M, 9C, and 9Bk, and the intermediate transfer belt 5B come in contact with each other. By the transfer, a full color image in which images by respective color toners are superimposed is formed on the intermediate transfer belt 5B. In forming an image, the sheets 4 housed in the paper feeding tray 1 are sent in order from a top sheet, conveyed on the intermediate transfer belt 5B, and transferred the full color toner image at a position (secondary transfer position 20) in which the intermediate transfer belt 5B and the sheet 4 come in contact with each other. At the secondary transfer position, a secondary transfer roller 21 is arranged, and presses the sheet 4 against the intermediate transfer belt 5B, thereby to enhance transfer efficiency. The secondary transfer roller 21 closely adheres to the intermediate transfer belt 5B, and has no contact/separation mechanism.

Figure 3:
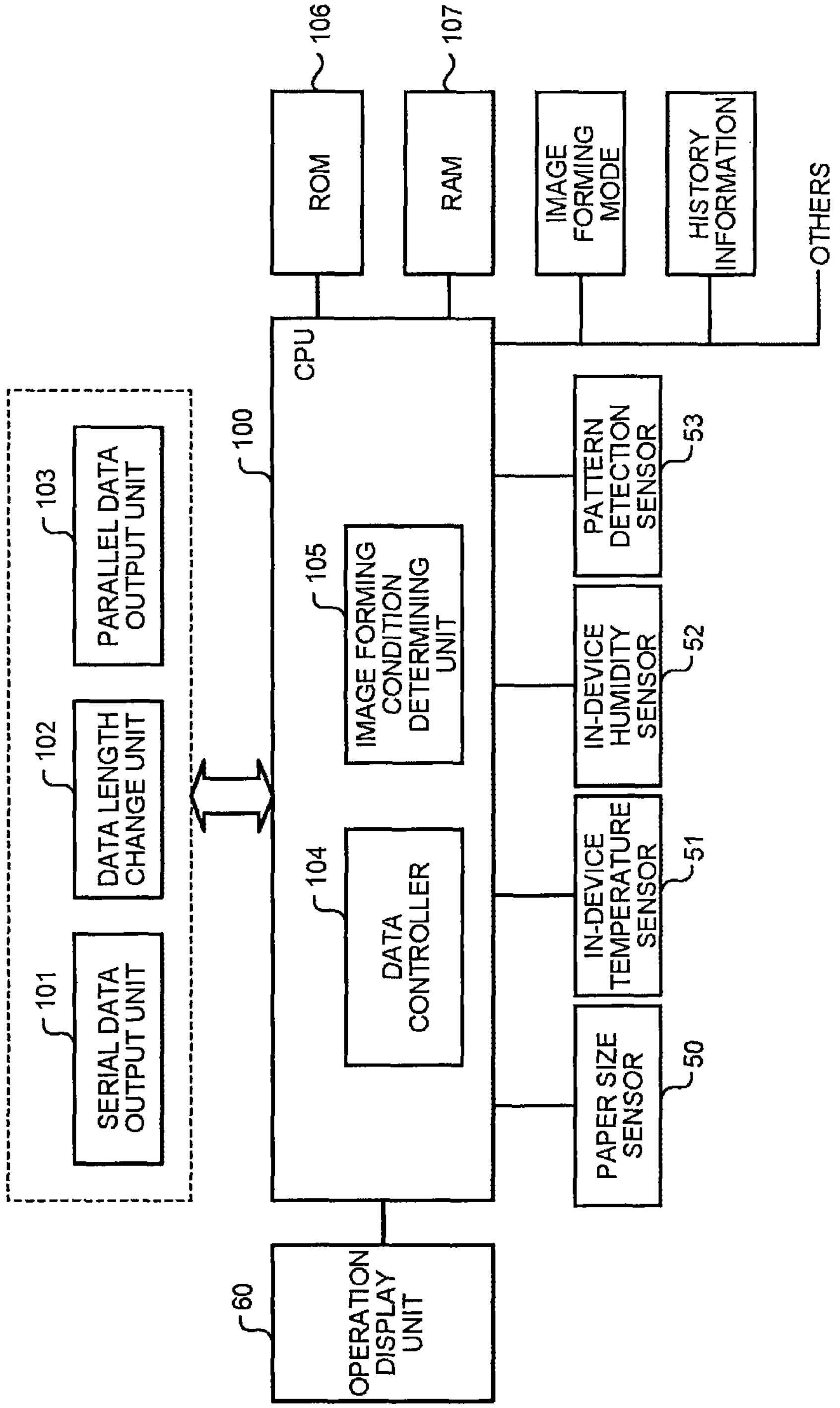
FIG. 3 is a block diagram illustrating a functional configuration according to the present embodiment.

FIG. 3 is a block diagram illustrating a functional configuration according to the present embodiment. As illustrated in FIG. 3, a serial data output unit 101, a data length change unit 102, a parallel data output unit 103, and a data controller 104. The data controller 104 includes a function of an image forming condition determining unit 105. The data controller 104 is configured from a central processing unit (CPU) 100, and configures a microcomputer system with a read-only memory (ROM) 106, a random access memory (RAM) 107, and the like.

A paper size sensor 50, an in-device temperature sensor 51, an in-device humidity sensor 52, a pattern detection sensor 53, and the like are connected to the data controller 104, and the data controller 104 is configured to be input detection information of these units. Further, the data controller 104 is connected to an operation display unit 60 that accepts a predetermined input by a user operation.

Further, an image forming mode, information of data reception by a facsimile function, history information such as noise occurrence history are input to the data controller 104. Further, the image forming mode includes at least an image quality selection mode in which resolution priority or gradation property priority can be selected, in addition to a normal mode. Further, the image forming mode includes a process linear velocity mode such as printing speed priority or low-speed printing, and a toner save mode in which toner consumption is decreased with respect to the normal toner.

The paper size sensor 50 is a sensor that detects the size of a sheet housed in the paper feeding tray 1 of the image forming apparatus illustrated in FIGS. 1 and 2. A single or a plurality of the in-device temperature sensors 51 is arranged in a predetermined position in the image forming apparatus, and detects the temperature in the apparatus. A single or a plurality of the in-device humidity sensors 52 is arranged in a predetermined position in the image forming apparatus, and detects the humidity in the apparatus.

The pattern detection sensor 53 is a sensor that detects a non-image pattern (a color matching correction pattern, density adjustment pattern, or a photoconductor static elimination pattern) formed outside an image forming region. The operation display unit 60 has a function to display acceptance of an operation input of the user and a state of the apparatus, in the image forming apparatus configured as illustrated in FIGS. 1 and 2.

The serial data output unit 101 converts image data into serial data, adds first data for detecting unique data in the image data to before the image data, and second data to after the image data, and outputs the serial data. That is, the serial data output unit 101 is configured from a serializer circuit, for example, converts the image data (parallel data) into serial data, adds the first data for detecting the unique data in the parallel data to before the unique data, and the second data to after the unique data, and outputs the serial data.

Note that the first data corresponds to an STP code, and the second data corresponds to an END mode, described below.

The data length change unit 102 changes data lengths of the first and second data. The parallel data output unit 103 converts the image data of the serial data output from the serial data output unit 101 into parallel data, and outputs the image data. That is, the parallel data output unit 103 converts the serial data output from the serial data output unit 101 into parallel image data using a deserializer circuit, for example, and outputs the parallel image data.

The data controller 104 controls the data length change unit 102, and changes the data lengths of the first and the second data to be added to before and after the image data, according to a condition under image formation. The data controller 104 determines the condition of image formation by the image forming condition determining unit 105, according to input information such as detection information of the above-described sensors, the image forming mode information, and the history information.

Further, the data controller 104 compares a transfer time necessary for transferring one line of image data, and a cycle of the one line, calculates a maximum data length that can be added to before and after the image data, and adds the first and second data of the maximum data length.

Further, the data controller 104 adds the first and second data of a fixed data length, with which a specific noise can be cancelled. The data controller 104 adds the first and second data, based on the detection information of the in-device temperature sensor 51 and the in-device humidity sensor 52. The data controller 104 adds the first and second data, based on the image quality mode selected in the image quality selection mode. The data controller 104 adds the first and second data, based on an image forming speed. The data controller 104 adds the first and second data when generating the non-image pattern outside an image region. The data controller 104 adds the first and second data at the toner save mode.

Note that all or a part of the above-described functions may be realized by a hardware circuit, instead of being realized by software (a program) using the CPU 100. That is, all or a part including the serial data output unit 101, the data length change unit 102, the parallel data output unit 103, the data controller 104, and the image forming condition determining unit 105 may be realized by a hardware circuit.

Figure 4:
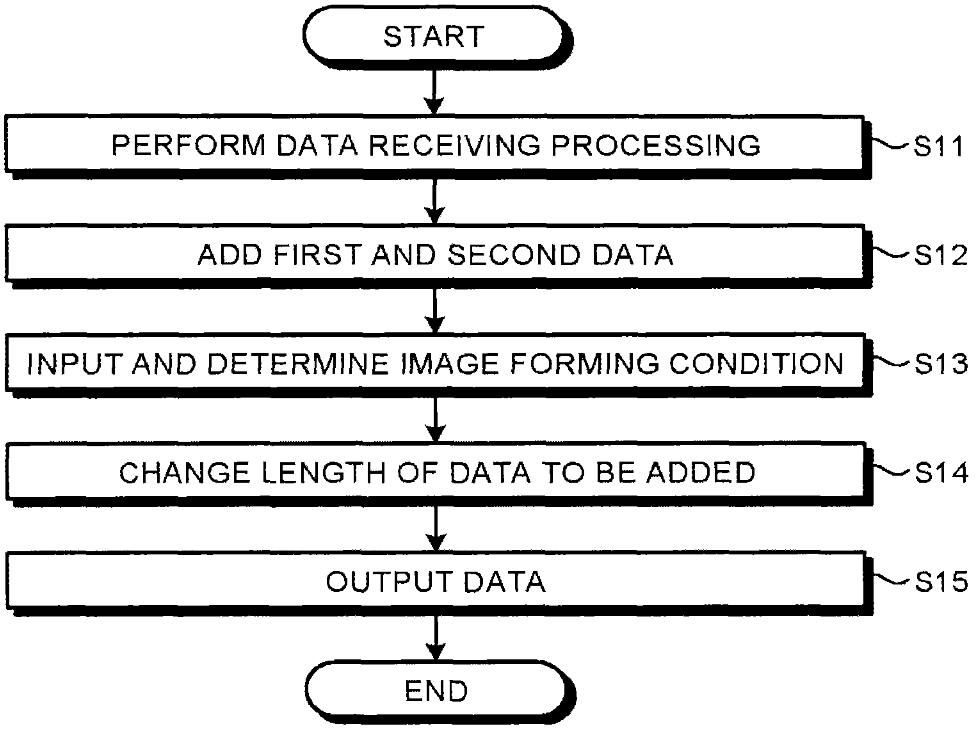
FIG. 4 is a flowchart illustrating a data processing operation of an image forming apparatus according to an embodiment.

FIG. 4 is a flowchart illustrating a data processing operation of an image forming apparatus according to an embodiment. The data processing operation is executed in the configuration illustrated in FIG. 3. First of all, the serial data output unit 101 receives and converts image data of parallel data into serial data (step S11). Following that, the serial data output unit 101 adds the first data for detecting unique data in the parallel data to before the unique data, and to after the second data (step S12).

Following that, the image forming condition determining unit 105 of the data controller 104 inputs a predetermined condition of when the received image data is processed and formed, and performs determination (step S13). Further, the data length change unit 102 changes the lengths of the first and second data to be added to before and after the image data, according to the image forming condition, by control of the data controller 104 (step S14). Following that, the parallel data output unit 103 converts the serial data into image data of parallel data, and outputs the image data (step S15). Note that a specific example of the image forming condition will be described below.

Figure 5:
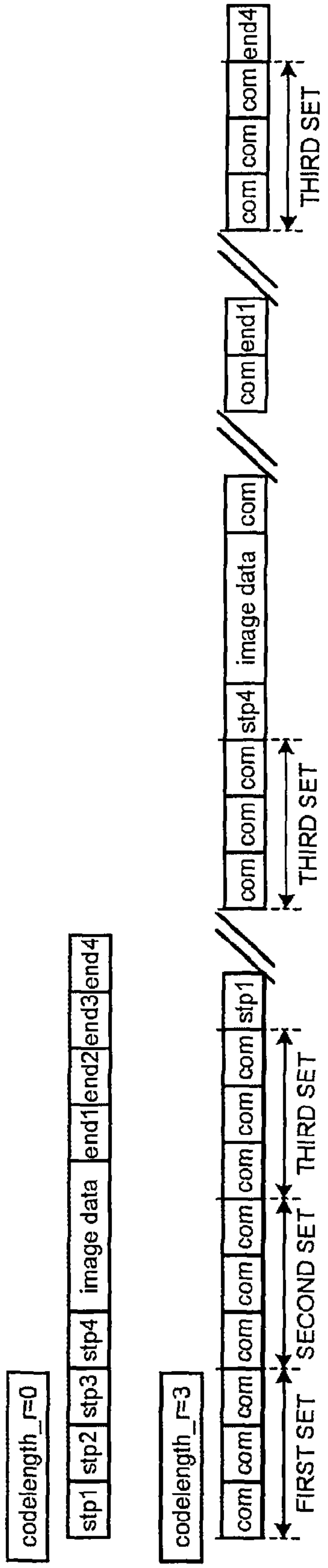
FIG. 5 is an explanatory diagram illustrating a concept of high-speed serial communication in which a symbol code length in SER-DES is changeable.

Next, a specific example of the above-described data control and the like will be described. FIG. 5 is an explanatory diagram illustrating a concept of high-speed serial communication in which a symbol code length in SER-DES is changeable. Note that the SER-DES is used when parallel interfaces are serially connected, and is an abbreviation of SERializer (serializer)-DESeralizer (deserializer) that mutually converts serial and parallel. In this SER-DES, data and a clock (timing information) are superimposed on one line and transmitted, using 8b/10b encoding, and the clock and the data are separated by a clock data recovery circuit at the receiving side. Hereinafter, the serializer and the deserializer are respectively described as SER and DES.

In FIG. 5, protocols of the STP/END codes are switched according to a set value of codelength_r. The codelength_r is set by a CPU outside the system. For example, when codelength_r=0, only STP/END codes are used. When codelength_r=1 to 15, a COM code is added in the STP code and the END code. Note that the STP code corresponds to the first data, and the END code corresponds to the second data.

Further, the STP/END codes in the example of FIG. 5 are four codes, respectively. That is, the STP/END codes are stp 1-4 and end 1-4. Note that the STP/END codes can be increased up to five codes. Three COM codes to be added in the STP/END codes constitute one set, and one set×codelength_r.

Further, the number of COM sets can be made variable depending on a clock rate and assumed noise occurrence time. For example, when 1 Gbps and codelength_r=3 in a transfer rate of the SER-DES, all code lengths of COM+STP are as follows. That is, (three COM codes×three sets+one STP code)×four STP codes×10 ns=400 [ns].

A noise due to static electricity or the like with respect to a transmission line is in the order of several 100 ns. When a maximum value of codelength_r: 15, an increased COM code length is three COM codes×15 sets×4×10 ns=1800 ns, and the noise can be avoided.

Detection of the STP/END codes of the DES side is considered as normal detection when two out of four STP/END symbols (or two out of five symbols) are detected. To distinguish and recognize the image data and outside of the image data at the DES side, the SER side adds the COM code to the outside of the image data, and the DES side performs detection. When having detected the COM code, the DES recognizes that the DES has received data outside of the image data.

Therefore, by transmission of a plurality of sets of the COM codes, not only the length between the COM/END codes is increased, but also noise detection with the COM code alone becomes possible. In the case of three COM codes as one set, when change from a certain symbol (either STP 1-4 or END 1-4) to one symbol COM has been detected, the detection is considered as normal detection if subsequent two COMB are detected.

Further, a code other than COM is used as the code variably inserted in the STP/END codes (for example: K28.6), so that the code can be distinguished from the code steadily inserted to the outside of the image data.

When detection of the STP/END codes is succeeded, it is recognized that the data has been normally transferred. When detection of the STP/END codes is failed, it is recognized that the data has been normally transferred if detection of the COM code (or K28.6) is succeeded.

When all of the detection of the STP/END codes and the detection of the COM code, it is recognized that the data transfer is abnormal. At this time, occurrence of abnormality of data transfer is notified. Further, one line of data is discarded.

Figure 6:
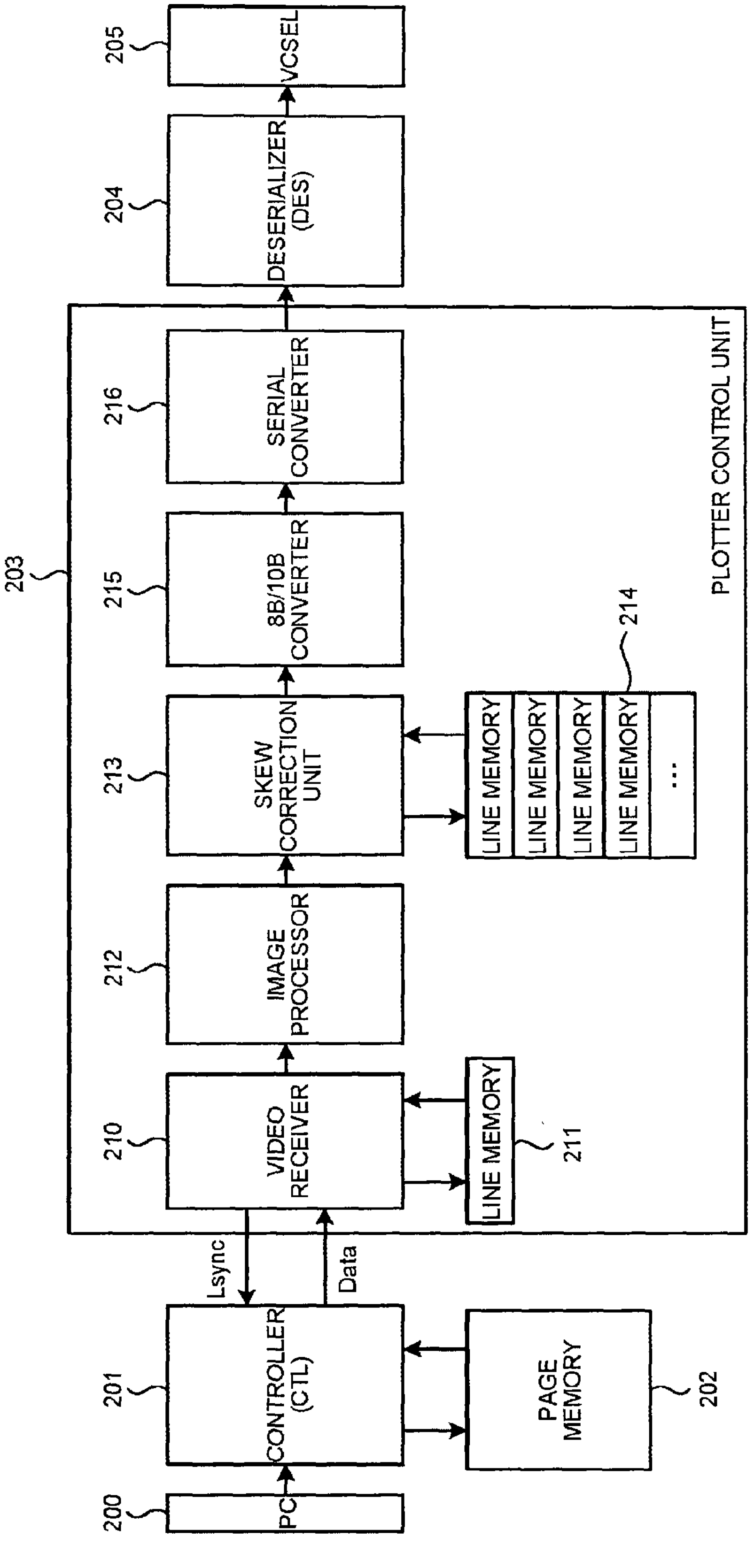
FIG. 6 is a block diagram illustrating a concept of a system (plotter control unit) that controls writing.

FIG. 6 is a block diagram illustrating a concept of a system (plotter control unit) that controls writing. As the high-speed serial communication in the present embodiment, a specification to transfer image data of electrophotography to a driver of a light source used in a high-speed image forming apparatus like vertical cavity surface emitting laser (VCSEL) is assumed.

The present system causes the image data output from a personal computer (PC) 200 to emit light in a vertical cavity surface emitting laser (VCSEL) 205 through a controller 201, a plotter control unit 203, and a deserializer 204.

The plotter control unit 203 includes a video receiver 210, a line memory 211, an image processor 212, a skew correction unit 213, a line memory 214, an 8B/10B converter 215, and a serial converter 216. Note that the 8B10B conversion is an algorithm of encoding used by the high-speed serial interface, and is a method to convert 8-bit data into a 10-bit symbol, and to transmit the data.

In FIG. 6, when a printing operation is instructed from the PC 200, the image data is transferred to the controller (CTL) 201 through a printer driver on the PC 200. The controller 201 develops the image data in a page memory 202 and converts the data into bitmap data, and transfers the data to the plotter control unit 203 as light emission data to be actually printed.

An LSYNC signal is output from the plotter control unit 203 to the controller 201. The controller 201 transfers the data to the plotter control unit 203 in accordance with output timing of the LSYNC signal. Examples of a transfer method include an image formation method that can process a format different in each color version, and an image forming method that processes only a common format among color versions.

There is a case in which the plotter control unit 203 may have a different operation clock frequency from the controller 201. In this case, the image data is stored in the line memory 211 once, and frequency conversion to read the data based on the operation clock of the plotter control unit 203 is performed.

Following that the image processor 212 adds an internal pattern and performs image processing such as trimming processing. Note that, when processing that requires a line memory such as jaggy correction is performed at the time of image processing, a line memory for image processing is included. The data subjected to the image processing in the image processor 212 is sent to the skew correction unit 213, and is stored in a plurality of the line memories 214 for skew correction. The skew correction unit 213 performs the skew correction processing by switching the line memory 214 to be read according to an image position. The skew correction unit 213 can perform frequency conversion by read/write of a skew correction memory.

When performing the skew correction, the skew correction unit 213 reads data from one line memory 214 N times, where a line period after reading is 1/N (N is an integer) the line period at the time of writing, so that the data after the skew correction becomes high-density data (density-doubling process) in which resolution in the sub-scanning direction becomes N times the resolution at the time of writing.

The data subjected to the skew correction+the density-doubling process is transferred to the 8B/10B converter 215, and data conversion and addition of the symbol codes are performed. The data subjected to 10B conversion in the 8B/10B converter 215 is received in the deserializer (DES) 204 after serial conversion, and is re-converted into the original 8B data. The vertical cavity surface emitting laser (VCSEL) 205 emits light, based on the re-converted 8B data.

Note that the light source is not limited to the VCSEL. For example, light emission of an LD, a multi LD, an LD array, or a line head (LEDA, organic EL) can be controlled. Further, in the case of a line head, it may be necessary to convert a data array according to wiring, depending on a dot array of the line head. At this time, when the array conversion extends across one line, a line memory is arranged after the skew correction processing, and the date subjected to the array conversion is read after the data is stored.

As described above, the deserializer circuit is connected to the driver of the vertical cavity surface emitting laser. Further, the deserializer circuit is connected to a driver of a multi laser. Alternatively, the deserializer circuit is connected to a driver of a line head.

Further, the deserializer circuit is used for receipt of image data from an outside of the image forming apparatus. Further, the serializer circuit is used for transmission of image data to an outside of the image forming apparatus.

Figure 7:
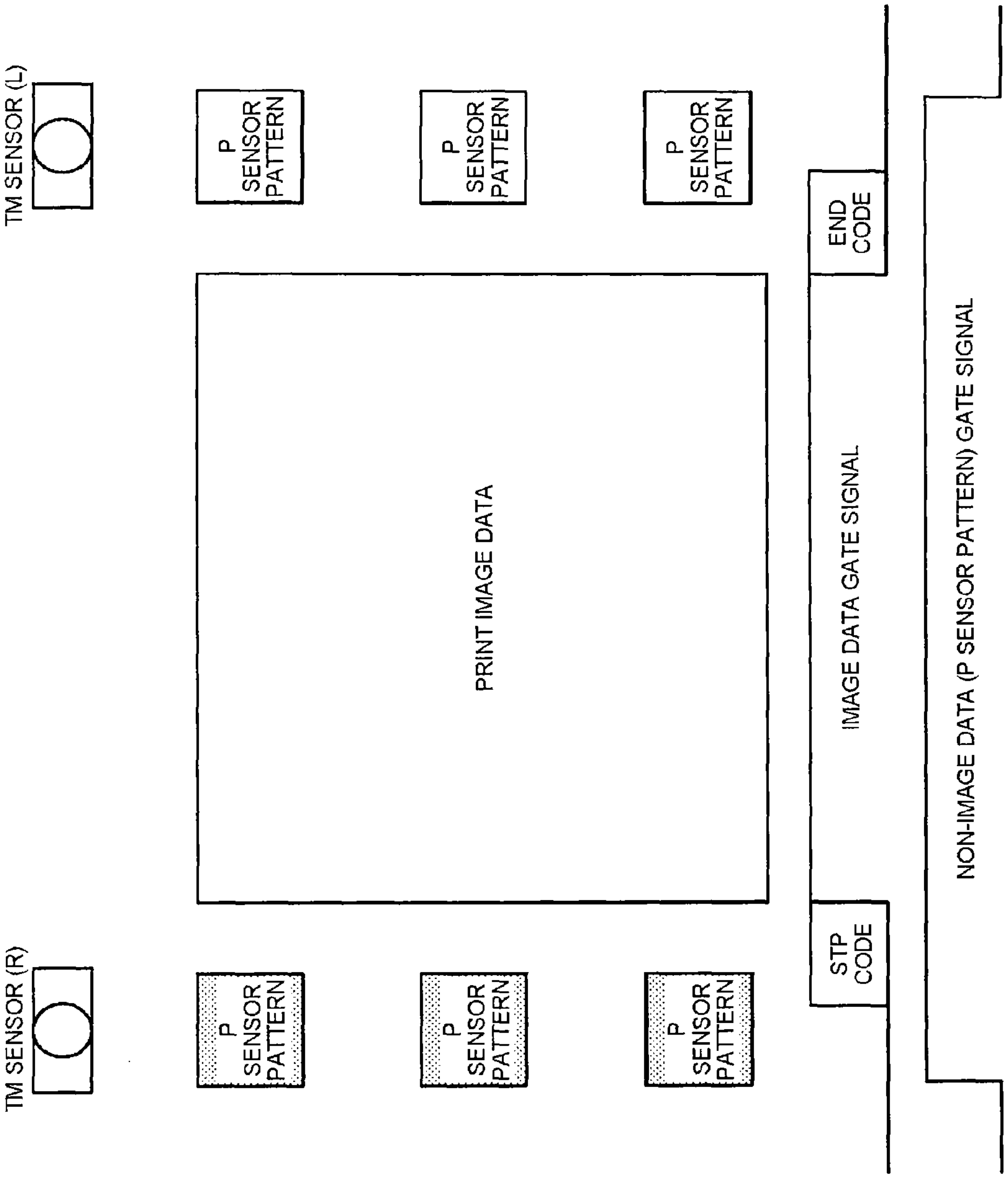
FIG. 7 is an explanatory diagram illustrating a concept of variable length control of symbol codes during an operation of an image forming apparatus.

In FIG. 7, a concept of variable length control of symbol codes during an operation of an image forming apparatus will be described. In the high-speed serial communication that can change the symbol code length used in the present embodiment, the STP code and the END code are added to before and after the image data to be transferred, and the lengths of the codes can be changed according to the set value of codelength_r.

First of all, a case of making the set value of codelength_r large is a case of improving the noise resistance performance. Examples will be given below.

(1) When printing is performed under a condition where a noise is more likely to occur in a communication path, due to occurrence of static electricity or the like. Note that it is known that static electricity is more likely to occur in an LL environment (low temperature and low humidity). Therefore, when a temperature value and a humidity value detected by the in-device temperature sensor 51 and the in-device humidity sensor 52 are predetermined values, the noise resistance performance is improved.

(2) When printing, retry of which is difficult when a printing error is caused, is performed in printing of facsimile (FAX) received data, or the like. That is, the data controller 104 makes the first and second data long and adds the first and second data when important data such as facsimile received data is printed.

(3) When printing with high image quality is performed when the setting of the image quality selection mode is photograph printing or new-year card printing.

(4) When there is a sufficient margin in transfer of image data when the setting of the image quality selection mode is high-speed printing for cardboard printing.

(5) When there is a sufficient margin in transfer of image data when the setting of the image quality selection mode is printing of a small-size image, a low-resolution image, or a low-gradation image.

In the above cases of (1) to (5), to improve the noise resistance performance, codelength_r is set to a value of 1 or more. As a method of setting codelength_, one of the following patterns is selected.

(1) A value with which a target noise can be cancelled is set. For example, in the case of measures against static electricity of 200 ns, codelength_r is set to 3.

(2) A value of MAX (=15) of codelength_hr is set. At this time, the printing speed is decreased in accordance with a limit of the transfer rate.

(3) A maximum possible value of codelength_r is set in accordance with the limit of the transfer rate. Note that this value is changed depending on the printing speed and a condition of a print image.

First of all, codelength_r is set to 1, and codelength_r is increased by 1 at a time, every time a noise is detected.

That is, when having detected a low temperature or a low humidity, the data controller 104 makes the lengths of the first and second data long.

Further, the data controller 104 makes the lengths of the first and second data long and adds the first and second data in the setting of image quality priority.

Meanwhile, contrary to the above case, there is a case in which there is no problem even if the noise resistance performance is low. Examples will be given below.

(1) When a possibility of occurrence of static electricity is low, such as a case where the temperature and the humidity in the apparatus is in an HH environment (high temperature and high humidity).

(2) There is no history of noise occurrence, and when it can be determined that the possibility of noise occurrence is low.

(3) At the time of forming a non-image pattern (the color matching correction pattern, the density adjustment pattern, or the photoconductor static elimination pattern).

Since the non-image pattern does not catch user's attention, some data defect does not interfere with the non-image pattern. Further, since the non-image pattern is formed with a solid pattern having a certain area or more, the non-image pattern is less likely to be subject to data defect. Further, the non-image pattern is typically arranged outside the printing region. Therefore, the data transfer time is long, and intrinsically, there is no sufficient margin to add codes.

That is, a sensor for detecting the non-image pattern is arranged outside the image size. Note that the non-image pattern is the density detection pattern. Further, the non-image pattern is the color matching correction pattern. Further, the non-image pattern is the photoconductor static elimination pattern.

(4) When printing with low image quality is performed when the setting of the image forming mode is printing of the toner save more.

(5) When the user specifies the setting of printing speed priority in the setting' of the image forming mode.

In the above cases, codelength_r is set to a minimum possible value. Here, codelength_r=0 is set. Further, a maximum possible value (which is changed according to the printing speed or a condition, of the print image) is set in accordance with the limit of the transfer rate.

As described above, when having detected the high temperature/high humidity environment, the data controller 104 adds the minimum first and second data.

Further, when generating the non-image pattern alone, the data controller 104 adds the minimum first and second data, and when superimposing the non-image-pattern and the image data, the data controller 104 adds non-minimum first and second data.

Further, when there is no history of noise occurrence, the data controller 104 adds the minimum first and second data. Further, when generating the non-image pattern, the data controller 104 adds the minimum first and second data.

Further, in the setting of toner save, the data controller 104 adds the minimum first and second data. Further, in the setting of productivity priority, the data controller 104 adds the minimum first and second data.

The data controller 104 adds the first and second data of the settable maximum data length. Further, the data controller 104 initially adds the minimum first and second data, and makes the lengths of the first and second data long and adds the first and second data, every time a noise is detected.

Further, in the minimum first and second data, different data is not inserted inside the lengths of the first and second data. Note that the data controller 104 resets the history of noise occurrence at the time of OFF of the power supply.

The data controller 104 changes the first and second data in the linear velocity mode other except the highest speed. Further, the data controller 104 changes the first and second data in the paper size mode except the maximum size. Further, the data controller 104 changes the first and second data in the image resolution mode except the maximum resolution. Further, the data controller 104 changes the first and second data in the image gradation mode except the maximum gradation.

According to the above-described embodiment, effects as follows are exhibited. In the image forming apparatus using high-speed serial communication, which adds a plurality of individual symbol codes to before and after data, and can change the number of insertion of the symbol codes, the number of insertion of the symbol codes is optimally set according to a condition of the image forming apparatus. Accordingly, stable transfer of the image data becomes possible without causing a limit on the printing speed. Therefore, the image forming apparatus that inserts the additional information to before and after data and performs the high-speed serial communication can realize high-speed printing while improving the noise resistance performance.

By the way, a program executed in the present embodiment is provided by being incorporated in the ROM 106 in advance. However, it is not limited to the case. The program executed in the present embodiment may be recorded in a computer-readable storage medium and provided as a computer program product. For example, the program may be recorded in a computer-readable storage medium such as a CD-ROM, a flexible disk (FD), a CD-R, or a digital versatile disk (DVD) with a file in an installable format or executable format and provided.

Further, the program executed in the present embodiment may be configured to be provided by being stored in a computer connected to a network such as the Internet, and downloaded through the network. Further, the program executed in the present embodiment may be configured to be provided or distributed through the network such as the Internet.

The program in the ROM 106 executed in the present embodiment has a module configuration including the serial data output unit 101, the data length change unit 102, the parallel data output unit 103, the data controller 104, and the image forming condition determining unit 105. As actual hardware, the CPU 100 (processor) reads the program from the storage medium and executes the program, so that the respective units are loaded on a main storage device such as a RAM. Then, the program is generated on the main storage device.

According to the embodiments described above, it is possible to exhibit an effect to realize transfer of image data without causing a limit on productivity.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:

circuitry configured to convert image data into serial data and output the serial data along with first data for detecting unique data in the image data and second data, so that the first data is arranged before the image data and the second data is arranged after the image data, change data lengths of the first data and the second data, and convert the image data of the serial data that has been output into parallel data, and output the parallel data, wherein the circuitry is configured to change the data lengths of the first data and the second data to be arranged before and after the image data according to a condition of image formation, and, depending on the condition of image formation, calculate a maximum data length arrangeable before and after the image data.

2. The image forming apparatus according to claim 1, wherein the circuitry is configured to compare a transfer time necessary for transfer of one line of image data with a period of the one line, calculate the maximum data length arrangeable before and after the image data, and change the first data and the second data of the maximum data length.

3. The image forming apparatus according to claim 1, wherein the circuitry is configured to change the first data and the second data of a fixed data length with which a specific noise is cancellable.

4. The image forming apparatus according to claim 1, further comprising:

a temperature sensor configured to detect a temperature of a predetermined position in the image forming apparatus; and a humidity sensor configured to detect a humidity of a predetermined position in the image forming apparatus, wherein the circuitry is configured to change the first data and the second data based on detection information of the temperature sensor and the humidity sensor.

5. The image forming apparatus according to claim 1, wherein the image forming apparatus has an image quality selection mode in which resolution priority or gradation property priority is at least selectable, in addition to a normal mode, and the circuitry is configured to change the first data and the second data based on an image quality mode selected in the image quality selection mode.

6. The image forming apparatus according to claim 1, wherein the image forming apparatus has an image forming mode in which a plurality of image forming speeds is selectable, the circuitry is configured to change the first data and the second data based on a selected image forming speed.

7. The image forming apparatus according to claim 1, wherein the circuitry is configured to change the first data and the second data when generating a non-image pattern outside an image region.

8. The image forming apparatus according to claim 1, wherein the image forming apparatus has a toner save mode in which toner consumption is suppressed, wherein the circuitry is configured to change the first and the second data in the toner save mode.

9. A non-transitory computer-readable storage medium with an executable program stored thereon and executed by a computer, wherein the program instructs the computer to perform:

converting image data into serial data;

outputting the serial data along with first data for detecting unique data in the image data and second data, so that the first data is arranged before the image data and the second data is arranged after the image data;

changing data lengths of the first data and the second data;

converting the image data of the serial data into parallel data;

outputting the parallel data; and changing the data lengths of the first data and the second data to be arranged before and after the image data according to a condition of image formation, and, depending on the condition of image formation, calculating a maximum data length arrangeable before and after the image data.

10. The image forming apparatus according to claim 1, wherein the circuitry is configured to change the first data and the second data of the maximum data length.

11. An image forming method comprising:

converting image data into serial data;

outputting the serial data along with first data for detecting unique data in the image data and second data so that the first data is arranged before the image data and the second data is arranged after the image data;

changing data lengths of the first data and the second data;

converting the image data of the serial data into parallel data;

outputting the parallel data; and changing, using circuitry, the data lengths of the first data and the second data to be arranged before and after the image data according to a condition of image formation, and depending on the condition of image formation, calculating a maximum data length arrangeable before and after the image data.

* * * * *